Oct. 7, 1958 A. V. LOUGHREN 2,855,457

COLOR-IMAGE-REPRODUCING APPARATUS

Filed Nov. 26, 1954 2 Sheets-Sheet 1

Oct. 7, 1958 A. V. LOUGHREN 2,855,457

COLOR-IMAGE-REPRODUCING APPARATUS

Filed Nov. 26, 1954 2 Sheets-Sheet 2

United States Patent Office 2,855,457

Patented Oct. 7, 1958

2,855,457

COLOR-IMAGE-REPRODUCING APPARATUS

Arthur V. Loughren, Great Neck, N. Y., assignor to Hazeltine Research, Inc., Chicago, Ill., a corporation of Illinois

Application November 26, 1954, Serial No. 471,340

19 Claims. (Cl. 178—5.4)

*General*

This invention relates to color-image-reproducing apparatus and, more particularly, to color-image-reproducing apparatus for color-television receivers of the image-projection type.

This application is a continuation-in-part of applicant's copending application Serial No. 422,434, filed April 12, 1954, and entitled "Color-Image-Reproducing Apparatus," now abandoned.

Color-image-reproducing apparatus for color-television receivers of the image-projection type heretofore proposed have had the disadvantage that adjustments of image-centering and image-focusing controls for the individual cathode-ray tubes of the apparatus must frequently be altered to maintain the images reproduced on the projection screen of the apparatus in register and in focus over any considerable period of time. One major cause of degradation of register and focus in such apparatus is variation of the high voltage supplied to the anodes of the individual cathode-ray tubes due to transient operating conditions, for example, line-voltage variations. Another major cause of degradation of focus and register in color-image-reproducing apparatus is variation of the focus and centering currents supplied to electromagnetic beam-focus and deflection windings due to transient operating conditions such as, for example, line-voltage variations or impedance variations of the windings caused by temperature variations of the apparatus. The requirement of frequently adjusting the centering and focusing controls of such apparatus renders the apparatus entirely unsatisfactory for many applications, such as home color-television receivers of the image-projection type. Moreover, the problem of maintaining image register and focus of individual cathode-ray tubes in receivers of this type has heretofore been considered so overwhelming by leaders in the electronics field that it has been a commonly held opinion that color-television receivers of the image-projection type suitable for home use are entirely impractical and commercially unfeasible.

It is an object of the present invention to provide a new and improved color-image-reproducing apparatus for a color-television receiver of the image-projection type which avoids one or more of the above-mentioned disadvantages of such apparatus heretofore proposed.

It is another object of the invention to provide a new and improved color-image-reproducing apparatus for a color-television receiver of the image-projection type which is capable of maintaining the several reproduced component color images in focus and in register over a considerable period of time.

It is another object of the invention to provide a new and improved color-image-reproducing apparatus for a color-television receiver of the image-projection type in which degradation of the focus and register of the component color images reproduced on the projection screen thereof due to high-voltage variations is minimized.

It is another object of the invention to provide a new and improved color-image-reproducing apparatus for a color-television receiver of the image-projection type in which degradation of the focus and register of the component color images reproduced on the projection screen thereof due to focus-current variations is minimized.

In accordance with a particular form of the invention, in a color-television receiver of the image-projection type including an image-display screen, color-image-reproducing apparatus comprises circuit means for supplying signals representative of predetermined primary colors of a composite color image to be reproduced. The apparatus also includes a plurality of cathode-ray image-reproducing devices responsive to the aforesaid signals for individually developing component color images individually representative of the primary colors of the composite image and an optical system for projecting the aforesaid component color images on the receiver screen in register. The apparatus also includes high-voltage supply-circuit means for exciting the cathode-ray devices and subject to undesired voltage variations which tend to degrade the image register of the devices and means controlling the individual cathode-ray beams of the cathode-ray image-reproducing devices and effective to position the individual image rasters thereof and subject to undesired variations which tend to degrade the image register of the devices. The apparatus includes means coupled to the high-voltage supply-circuit means and to the beam-control means for controlling one of the high-voltage supply and beam-control means in accordance with variations of the other substantially to reduce any register degradation caused thereby.

For a better understanding of the present invention, together with other and further objects thereof, reference is had to the following description taken in connection with the accompanying drawings, and its scope will be pointed out in the appended claims.

Referring to the drawings.

Figure 1:
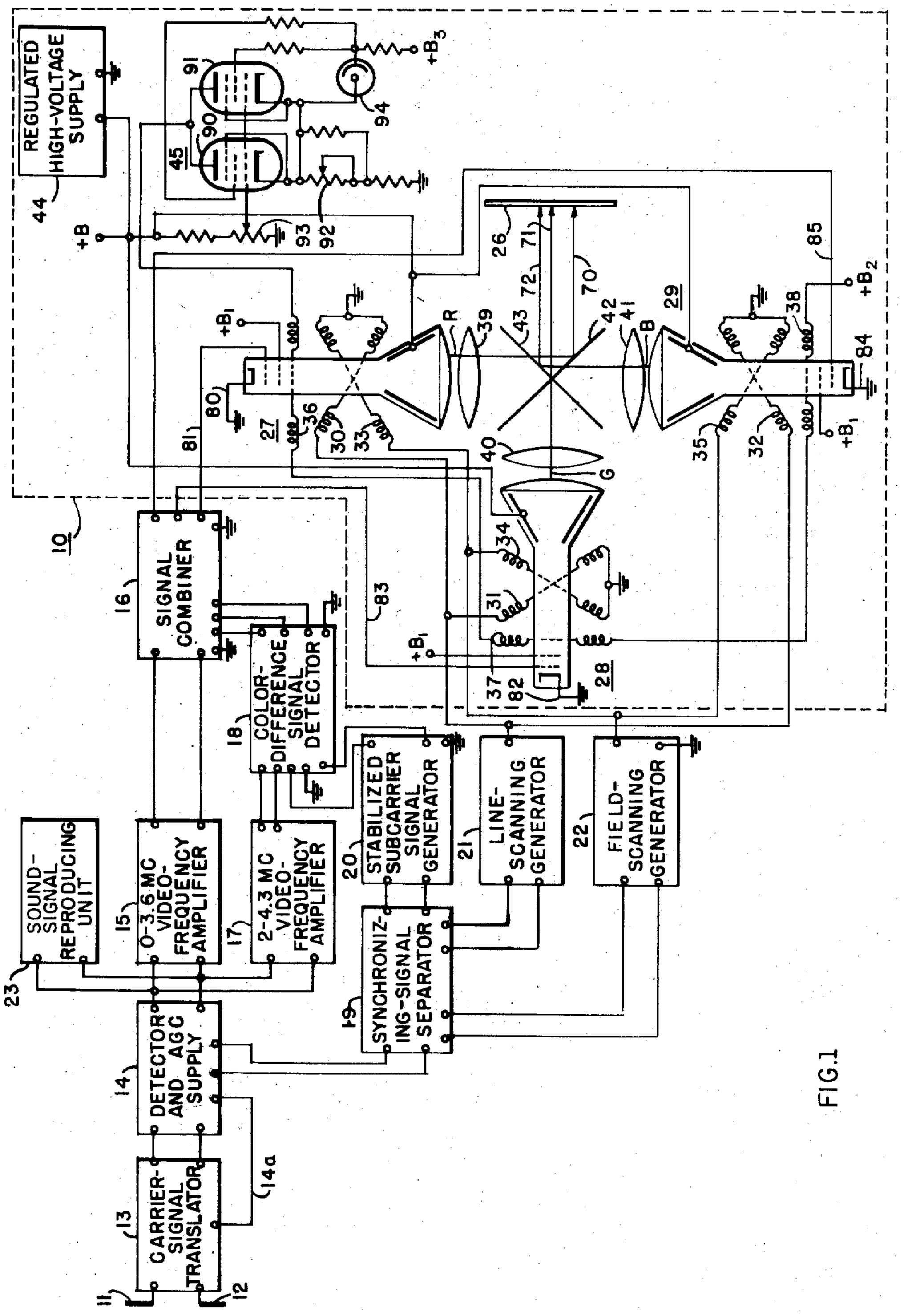
Fig. 1 is a circuit diagram, partly schematic, of a color-television receiver of the image-projection type including color-image reproducing apparatus constructed in accordance with the invention.

*General description of Fig. 1 color-television receiver*

Referring now more particularly to Fig. 1 of the drawings, there is represented a color-television receiver of the image-projection type including color-image-reproducing apparatus 10, constructed in accordance with the invention and more fully described hereinafter. With the exception of the image-reproducing apparatus 10, the receiver may be of a conventional type, for example, of a constant-luminance type described and claimed in the copending application of Bernard D. Loughlin, Serial No. 159,212, filed May 1, 1950, and entitled "Color-Television System." Receivers of this type are further described in the October 1951 issue of the Proceedings of the I. R. E. in an article entitled "Recent Improvements in Band-Shared Simultaneous Color-Television Systems" by Loughlin, and in an article by Hirsch, Bailey, and Loughlin entitled "Principles of NTSC Compatible Color Television," Electronics, February 1952.

The Fig. 1 receiver includes an antenna system 11, 12, a carrier-signal translator 13 which may be of the conventional superheterodyne type, and a detector and automatic-gain-control or "AGC" supply 14, coupled in cascade and in the order named, for receiving a wave signal modulated by a composite color video-frequency signal and for deriving the latter signal therefrom. The AGC supply of unit 14 is coupled to the input circuit of one or more stages of unit 13 by a control-circuit conductor 14*a*.

There is connected to the detector and AGC supply 14 a video-frequency amplifier 15 for translating at least the low-frequency portion of the video-frequency signal, and preferably the frequency band of 0–3.6 megacycles comprising the monochrome-signal component capable of reproducing an image substantially of the type normally reproduced in a conventional monochrome or black-and-white receiver and, thus, representative of the brightness and detail of the image. The output circuit of the video-frequency amplifier 15 is connected to an input circuit of a signal combiner 16 of a conventional type which may comprise, for example, three adders having individual input circuits coupled to the amplifier 15.

There is also connected to the output circuit of the detector of the unit 14 a signal-translating channel responsive to the modulated subcarrier signal component of the video-frequency signal derived by the detector for supplying three color-difference signals. This channel includes a video-frequency amplifier 17 having a pass band of, for example, 2–4.3 megacycles and a color-difference signal detector 18 coupled thereto and preferably comprising a matrixing system for deriving color-difference signals which, relative to the monochrome or luminance-signal component, represent the chromaticity or color quality of an image definable by its dominant wave length and its purity taken together. The matrixing system of the detector 18 preferable is proportioned in accordance with the teaching of the above-mentioned Loughlin application to impart a constant-luminance characteristic to the receiver. The color-difference signal detector 18 has three output circuits individually connected to the input circuits of the three adders of the signal combiner 16 for supplying the color-difference signals thereto for combination with the monochrome signal to develop three color signals individually representative of predetermined primary colors of the color image to be reproduced. The three output circuits of the signal combiner 16 are individually connected to cathode-ray image-reproducing devices of the apparatus 10, as will be more fully described subsequently.

The term "predetermined primary color," as used herein and in the appended claims with reference to a color image, is defined by predetermined dominant wave-length and purity factors and by a variable intensity factor determined by the image. Further, the primary colors individually represent distinct and widely spaced regions of the visible spectrum. No primary color of a selected set of, for example, three primary colors can be matched by a combination of any other primary colors of the set.

The receiver also includes a synchronizing-signal separator 19 for deriving the subcarrier synchronizing signal and line-synchronizing and field-synchronizing signals from the video-frequency signals applied thereto by the unit 14. One output circuit of the synchronizing-signal separator 19 is coupled to a stabilized subcarrier signal generator 20 of conventional phase-controlled oscillator design having a pair of output circuits connected to the input circuits of the color-difference signal detector 18 for providing a pair of phase-displaced unmodulated subcarrier signals, for example, signals in phase-quadrature, for individually beating with the modulated subcarrier signal component applied to the color-difference signal detector by the amplifier 17 to derive in the detector 18 the color-difference signals. The receiver also includes line-scanning and field-scanning generators 21 and 22, respectively, connected in a conventional manner to the scanning circuits of the image-reproducing apparatus 10 for effecting synchronous scanning of the individual cathode-ray tubes thereof.

The television receiver also includes a sound-signal reproducing unit 23 of conventional construction connected to the detector of the unit 14 and comprising the usual sound intermediate-frequency amplifier, frequency-modulation detector, audio-frequency amplifier, and loudspeaker.

*General operation of Fig. 1 color-television receiver*

Considering briefly the operation of the Fig. 1 receiver as a whole, a modulated color-television wave signal intercepted by the antenna system 11, 12 is selected by the carrier-signal translator 13 which amplifies and converts the same to an intermediate-frequency signal and supplies that signal to the detector of the unit 14. The detector of unit 14 derives the modulation components comprising a video-frequency signal having a luminance component comprising frequency components in a band of, for example, 0–3.6 megacycles. The video-frequency signal is translated through the video-frequency amplifier 15 to the signal combiner 16 for combination with color-difference signals supplied thereto in a manner more fully explained hereinafter.

For the purpose of developing color images in the color-image-reproducing apparatus 10, a modulated subcarrier signal component in the frequency band of 2–4.3 megacycles of the video-frequency signal derived by the detector of the unit 14 is translated through the video-frequency amplifier 17 and applied to the color-difference signal detector 18. The quadrature-phase subcarrier output signals of the stabilized subcarrier signal generator 20 beat with the modulated subcarrier signal component applied to the color-difference signal detector to develop in the individual output circuits thereof separate color-difference signals individually including 0–2 megacycle frequency bands and comprising the modulation components of the modulated subcarrier signal component and which, relative to the luminance-signal component, represent the chromaticity components of the predetermined primary colors of the composite color image to be reproduced, for example, the red, green, and blue chromaticity components. The red, green, and blue color-difference signals then effectively are individually combined in the signal combiner 16 with the luminance component applied thereto to provide, for example, red, green, and blue color signals individually representative of the intensities of predetermined primary colors of the image to be reproduced, which are applied to the apparatus 10 in a conventional manner.

The synchronizing-signal components of the video-frequency signal developed in the output circuit of the unit 14 are separated from the luminance and color-difference signal components by the separator 19 and are applied to the line-scanning and field-scanning generators 21 and 22 to synchronize the operation thereof. These generators preferably supply signals of saw-tooth wave form for application to the deflection circuits of the color-image-reproducing apparatus 10 to control the line-scanning and field-scanning operations thereof. The synchronizing-signal separator 19 also derives a synchronizing signal comprising, for example, several cycles of an unmodulated subcarrier reference signal for controlling the phases of the output signals of the generator 20 in a conventional manner.

The automatic-gain-control or AGC signal derived in unit 14 is effective to control the amplification of one or more stages of the unit 13 to maintain the signal input to the detector of the unit 14 within a relatively narrow range for a wide range of received signal intensities.

In accordance with the operating principles of an intercarrier television receiver, the sound intermediate-frequency signal supplied by the carrier-signal translator 13 beats in the detector of the unit 14 with the picture intermediate-frequency signal to derive a second sound intermediate-frequency signal in the detector output circuit. This sound intermediate-frequency signal is amplified in the unit 23 and the audio-frequency modulation components thereof are derived and converted into sound in a conventional manner.

*Description of color-image-reproducing apparatus of Fig. 1 receiver*

Referring now more particularly to the color-image-reproducing apparatus 10 of the Fig. 1 receiver, the apparatus includes circuit means for supplying preferably three signals individually representative of three predetermined primary colors of a composite color image to be reproduced. This circuit means comprises, for example, the input conductors 80, 81, 82, 83, and 84, 85 of the apparatus, coupled to the three output circuits of the signal combiner 16.

The apparatus also preferably includes an image-display screen 26 of suitable distributing material and a plurality of cathode-ray image-reproducing devices including means for controlling the individual cathode-ray beams thereof and effective to position the image rasters thereof. The cathode-ray devices are responsive to the supplied signals for individually developing component color images individually representative of the primary colors of the composite image. The terms "component color images," in referring to images developed by the cathode-ray devices, is employed in its broad sense to designate light representative of images which may be out of focus or invisible to the eye, as well as visible sharply defined images. In the Fig. 1 tricolor system, the apparatus 10 preferably includes three cathode-ray devices 27, 28 and 29. These devices may be of conventional image-projection construction including the usual cathode, first and second control electrodes, and anode and associated circuit connections. More particularly, the cathodes and first control electrodes of the devices are connected to the supply-circuit conductors 80, 81, 82, 83, and 84, 85, respectively.

The cathode-ray devices 27, 28, and 29 also have the usual individual beam-deflection circuits comprising line-scanning windings 30, 31, and 32, respectively, and field-scanning windings 33, 34, and 35, respectively. To develop color images individually corresponding to predetermined primary colors, for example, red, green, and blue, the devices 27, 28, and 29 may have phosphor screens for emitting, for example, red, green, and blue light, respectively. Alternatively, the devices may utilize phosphor screens which emit wide band light for use in connection with suitable light filters which individually transmit, for example, only red, green, and blue light, effectively to impart desired hue and saturation factors to individual images developed at the faces of the tubes 27, 28, and 29.

Figure 2:
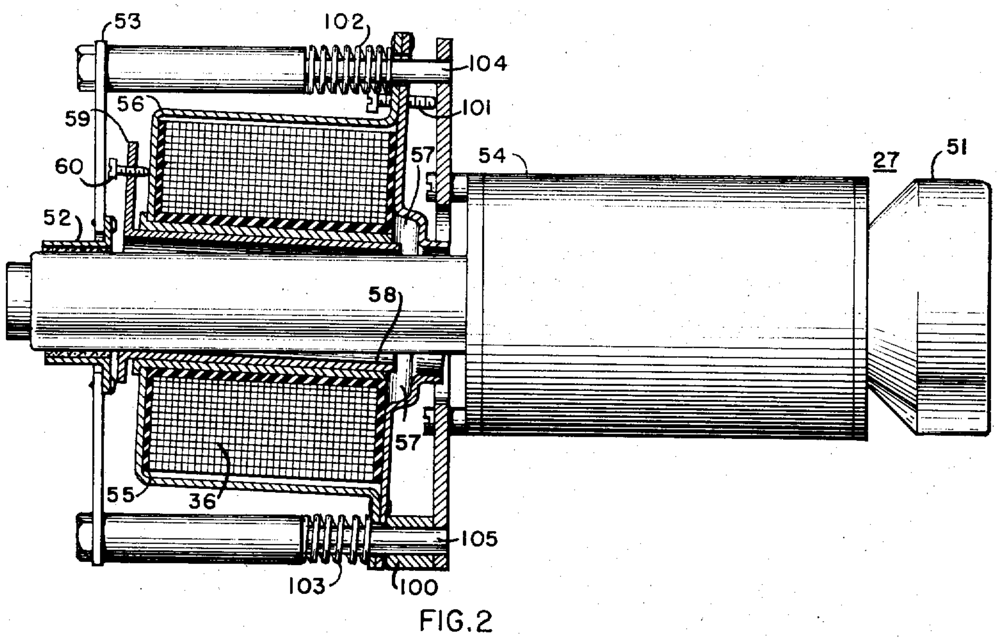
Fig. 2 is an illustration, partly in section, of one of the cathode-ray image-reproducing devices of the Fig. 1 receiver.

The previously mentioned beam-control means of the cathode-ray devices 27, 28, and 29 preferably comprise focusing means comprising individual electromagnetic windings 36, 37, and 38 which may be adjustably positioned and ordinarily inherently have three differing magnetic beam-control characteristics. Referring now more particularly to Fig. 2, the device 27 is represented as including a cathode-ray tube 51 adjustably mounted by a suitable clamp 52 on a supporting frame 53. Also mounted on the support 53 is a yoke 54 comprising conventional line-scanning and field-scanning windings, such as the windings 30, 33 of Fig. 1.

The focusing winding 36 of the device 27 may be of conventional construction wound about a suitable spool 55 of insulating material and mounted in a magnetic metal frame 56 which is adjustably positioned on the support 53 by, for example, springs 102, 103 disposed about studs 104, 105, respectively, spacer 100 disposed about stud 105 and adjustable screws, such as screws 101 threaded in the frame 56. A narrow gap 57 is provided at one end of the frame 56 for allowing magnetic flux developed by the winding 36 to pass through the neck of the tube 51. There preferably is also provided for the tube 51 a magnetic shunt comprising, for example, a seamless, steel cylinder 58 having a terminal flange 59 and adjustably positioned axially relative to the winding 36 by means of a suitable set screw 60 threaded in the flange 59 for imparting to the focusing means of the device 27 magnetic beam-control characteristics similar to those of the focusing means of the devices 28 and 29 of Fig. 1 by controlling the width of the gap 57. The magnetic shunt 58 preferably fits snugly within the axial aperture of the focus winding structure and may be gradually disengaged from a position of maximum engagement therewith by adjustment of the screw 60. The devices 28 and 29 may be of similar construction to the device 27 and preferably utilize magnetic shunts of the same material as the shunt 58 and having substantially identical temperature coefficients of expansion.

Referring again to Fig. 1, the color-image-reproducing apparatus 10 preferably includes an optical system comprising, for example, lens means and dichroic mirror means intermediate the devices 27, 28, 29 and the screen 26 for projecting thereon component color images in register. The lens means includes, for example, three converging lenses 39, 40, and 41 of conventional construction individually disposed between the devices 27, 28, and 29 and the display screen 26. The dichroic mirror means may comprise, for example, a red-light-reflective mirror 42 which transmits green and blue light and a blue-light-reflective mirror 43 which transmits red and green light disposed at right angles relative to each other. By the term "optical system" is meant any suitable system capable of transmitting light to develop a visual image on a display screen. The focusing means, including windings 36, 37, and 38 and corresponding magnetic shunts, preferably are stably positioned relative to the cathode-ray devices 27, 28, 29 and the optical system to maintain the component color images on the screen in register.

The apparatus 10 also includes high-voltage supply-circuit means for exciting the cathode-ray devices 27, 28, and 29 and subject to undesired voltage variations which tend to degrade the image focus of the devices or the image register thereof. More particularly, the high-voltage supply-circuit means preferably comprises a high-voltage supply unit 44 of conventional construction for providing a high voltage of, for example, 25 kilovolts and regulated to limit voltage variations to a few kilovolts to prevent damaging the cathode-ray devices.

There is also provided means coupled to the high-voltage supply-circuit means 44 and to the beam-control means of the devices 27, 28, and 29 for controlling the beam-control means in accordance with the voltage variations of the supply-circuit means substantially to reduce any focus or register degradation caused thereby. More particularly, the controlling means preferably comprises a current regulator 45 coupled to the electromagnetic windings 36, 37, and 38, in series, of the focusing means for controlling the same by a current which maintains the magnetic field intensity approximately directly proportional to the square root of the high voltage, as will be more fully explained subsequently. To this end, the current regulator 45 comprises, for example, a pair of parallel-connected tubes 90, 91 having anodes connected to the focus windings 36, 37, 38. The cathode circuit of the tubes 90, 91 includes an adjustable resistor 92 for adjusting the effective circuit transconductance. The control electrodes of the tubes are coupled through an adjustable voltage divider 93 to the source +B for applying to the tubes voltage variations representative of the high-voltage variations to render the regulator 45 responsive to the output voltage of the supply 44. The screen electrodes of the tubes 90, 91 are coupled through a voltage regulator tube 94 of a conventional type to the cathodes for maintaining a constant screen-cathode potential difference. A suitable source of screen potential $+B_3$ is coupled to the anode of the voltage regulator tube 94.

*Operation of color-image-reproducing apparatus of Fig. 1 receiver*

Considering now the operation of the color-image-reproducing apparatus 10 of the Fig. 1 receiver, the cathode-ray tubes of the devices 27, 28, and 29 may be suitably mounted relative to the optical system to project color images on the display screen 26 which are approximately in register. The images may then be brought into register by mechanical adjustment of the relative positions of the magnetic focusing windings 36, 37, and 38, and the cathode-ray tubes 51 of the devices 27, 28, and 29, respectively. This adjustment controls the centering of the images developed at the faces of the cathode-ray tubes 51 and may result in an angular disposition of the focusing windings relative to the envelopes of the devices, as represented to an exaggerated degree in Fig. 2. The adjustable voltage divider 93 and resistor 92 of the current regulator 45 may be adjusted to focus one or more of the cathode-ray tubes 51 by controlling the bias of the tubes 90, 91 and the focus-current flow through windings 36, 37, 38 in accordance with the value of the high-voltage output of the supply 44, which ordinarily is stable over the adjustment interval. The magnetic shunts, such as the shunt 58 of Fig. 2, may then be adjusted relative to the respective magnetic windings to impart to the individual focusing means substantially identical magnetic beam-control characteristics, which may differ in polarity of magnetic field intensity in accordance with the sense of current flow through the individual windings, to cause focusing of all three cathode-ray tubes in response to the previously adjusted focus-current flow. Adjustment of the magnetic shunts may degrade the register to a slight degree and the above-described operations may be repeated once or twice until the images projected by the devices 27, 28, and 29 are in focus and in register on the screen 26.

When the images on the display screen 26 are in focus and in register, the devices 27, 28, and 29 respond to, for example, the red, green, and blue color signals applied to the control electrode-cathode circuits thereof by the signal combiner 16, respectively to develop on the faces of the devices red, green, and blue color images which are projected as indicated by arrows 70, 71, and 72, respectively, through the optical system comprising the lenses 39, 40, and 41 and mirrors 42 and 43 to the display screen 26 to form a composite color image. The line-scanning windings 30, 31, and 32 and the field-scanning windings 33, 34, and 35 of the devices 27, 28, and 29, respectively, respond to saw-toth signals supplied thereto by the line-scanning and field-scanning generators 21 and 22, respectively, to determine the dimensions of the projected images.

In the event that the output voltage of the high-voltage supply 44 varies, as might occur due to normal voltage variations of the low-voltage supply circuit of the receiver, the beams of the cathode-ray tubes of the devices 27, 28, and 29 travel therethrough at variable speed affecting the interval during which a given beam portion is in the corresponding focusing field. This high-voltage variation, therefore, in the absence of compensation, would produce a degradation of the focus of one or more of the devices 27, 28, 29.

Moreover, as is well known in the field of electron optics, the beam of a cathode-ray tube rotates as it traverses a magnetic focusing field which acts as an effective magnetic lens. If the cathode-ray beam does not travel exactly along the focal axis of the effective magnetic lens, variation of the beam rotation causes a corresponding displacement of the point of impingement of the beam on the tube face. Since the focusing windings of the three cathode-ray tubes cannot ordinarily be aligned in identical manner with respect to the cathode-ray beam thereof, variation of beam rotation reulting from high-voltage variation, in the absence of compensation, cause different displacements of the rasters on the cathode-ray tube faces and, thus, degradation of the image register oft he devices 27, 28, 29.

In accordance with well-known principles of electron optics, the relation of anode voltage to focal length and cathode-ray beam rotation in a cathode-ray tube having a focusing winding serving as an effective magnetic lens may be approximately expressed by the following equations:

$$\frac{1}{f}=\frac{e}{8mV}\frac{1}{}\int H_z^2dz \qquad (1)$$

$$\theta=\left(\frac{e}{8m}\right)^{1/2}\frac{1}{V^{1/2}}\int H_z dz \qquad (2)$$

where $f$=focal length of effective magnetic lens
$e$=charge of an electron
$m$=mass of an electron
$H_z$=magnetic field intensity along axis of lens
$dz$=differential distance along axis of lens
$V$=potential of accelerating anode
$\theta$=angle of beam rotation through lens Assuming that no saturation of the metal in the flux paths in the focusing winding occurs and that the effect of stray magnetic fields such as the earth's field is minimized, for example, by suitable shielding, the magnetic intensity along the axis of the effective magnetic lens of the cathode-ray tube may be expressed by the following equation:

$$H_Z=If(z) \qquad (3)$$

where $I$=current flow through focusing winding
$f(z)$=function directly proportional to magnetic field intensity distribution along the axis of effective magnetic lens By substituting Equation 3 into Equation 1 and simplifying, the following expression may be obtained:

$$\frac{1}{f}=\frac{e}{8mV}\frac{I^2}{}\int f^2(z)dz \qquad (4)$$

Similarly, by substituting Equation 3 into Equation 2 and simplifying, the following equation may be obtained:

$$\theta=\left(\frac{e}{8m}\right)^{1/2}\frac{I}{V^{1/2}}\int f(z)dz \qquad (5)$$

From Equations 4 and 5, it will be apparent that so long as the focusing current I is maintained proportional to the square root of the high voltage V, the focal length of the effective magnetic lens and the cathode-ray beam rotation remain constant notwithstanding high-voltage variations. The desired relation may be expressed by the following equation:

$$I=kV^{1/2} \qquad (6)$$

where $k$=a constant

If the high-voltage variations occur over a relatively narrow range of, for example, 10 percent of the normal high voltage, a linear approximation of the desired relation between the focusing current and the high voltage provides adequate compensation to maintain the reproduced images in focus and in register. This relation, which may be derived from Equation 6, may be expressed by the following equation:

$$\frac{\Delta I}{I}=\frac{1}{2}\frac{\Delta V}{V} \qquad (7)$$

where $\Delta I$=focusing-current variation
$\Delta V$=high-voltage variation

During the initial adjustment procedure, the current regulator 45 may be adjusted to provide a variation of focusing current in response to high-voltage variation in accordance with Equation 7 by adjustment of resistor 92 which controls the effective transconductance of the current regulator 45. In practice, however, it may be found that, due to saturation effects of the focus windings or to stray magnetic fields, the preferred relation is expressed by equation:

$$\frac{\Delta I}{I}=k_1\frac{\Delta V}{V} \qquad (8)$$

where $k_1$=a constant for a given set of operating conditions

Accordingly, when the output voltage of the supply 44 varies, causing a variation of the control electrode-cathode bias of the regulator 45, a common current flow through the regulator 45 and the magnetic focusing windings 36, 37, 38 has in response thereto percentage variations which are directly proportional to percentage variations of the high voltage and thus the magnetic field intensity remains approximately proportional to the square root of the high voltage to compensate for the voltage variation. Because the focusing means of the devices 27, 28, 29 are initially adjusted to have substantially identical beam-control characteristics, the variation of focusing current affects the cathode-ray beams of the devices 27, 28, and 29 in substantially identical manners. Accordingly, the image rasters on the three cathode-ray tubes remain stationary and in focus and, thus, the color-image components of the composite reproduced image remain in register.

Figure 3:
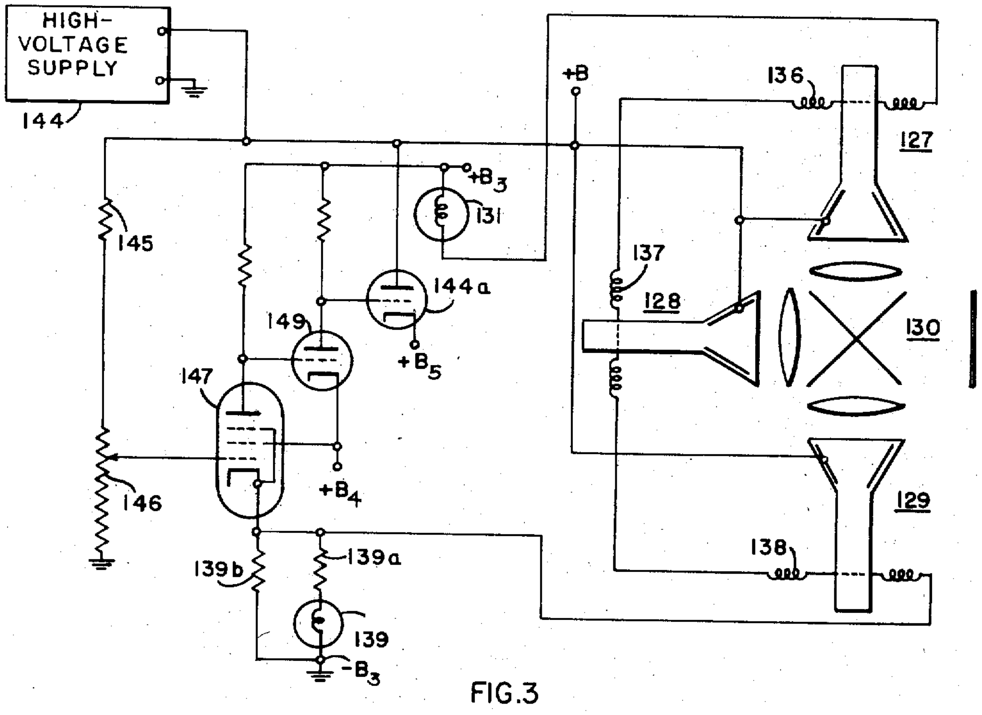
Fig. 3 is a detailed circuit diagram of a modified form of color-image-reproducing apparatus constructed in accordance with the invention.

*Description of Fig. 3 apparatus*

Referring now more particularly to Fig. 3 of the drawings, there is represented color-image-reproducing apparatus constructed in accordance with a modified form of the invention. This apparatus includes three cathode-ray tubes 127, 128, 129 of similar construction to their counterparts in the Fig. 1 apparatus. The input electrodes and deflection windings of the cathode-ray tubes are not represented in the Fig. 3 drawing for the sake of simplicity, but it will be understood that such electrodes are coupled to other units of a television receiver in a manner similar to the connections of corresponding elements of the Fig. 1 receiver. An optical system 130 similar to the optical system of the Fig. 1 receiver is utilized.

The beam-control means for the Fig. 3 apparatus includes energizing circuit means $\pm B_3$ connected through a ballast tube 131, for reasons more fully explained subsequently, focus windings 136, 137, 138 and, for example, incandescent lamp 139 and associated resistors **139*a*, 139*b*** having a joint impedance characteristic which follows, for example, a square-law function, that is, current flow through the lamp circuit develops a voltage thereacross which is proportional to, for example, the square of the magniture of the current flow. In accordance with theory previously explained in connection with the Fig. 1 embodiment, due to saturation effects or stray magnetic fields, the magnitude of the desired voltage may be proportional to another function of the magnitude of the current flow.

The apparatus also includes a high-voltage supply 144 and regulator tube **144*a* for exciting the cathode-ray tubes and means coupled to the high-voltage supply-circuit means 144, 144*a* and to the beam-control means for controlling the high-voltage supply-circuit means in accordance with variations of the beam-control means substantially to reduce any register degradation caused thereby. More particularly, the control means comprises an adjustable voltage divider 145, 146 coupled across the high-voltage supply terminals and coupled to the control electrode of an amplifier tube 147 having a cathode connected to the lamp circuit 139, 139*a*, 139*b*. The output circuit of the amplifier tube 147 is coupled to the input circuit of an amplifier tube 149 which, in turn, has its output circuit coupled to the input circuit of the high-voltage shunt regulator tube 144*a* which is coupled in parallle with the high-voltage supply 144 between the terminal +B thereof and a terminal $+B_5$. This control means is effective to maintain the magnitude of the high voltage supplied by the high-voltage supply-circuit means 144, 144*a*** approximately directly proportional to, for example, the square of the magnetic field intensity developed by the focusing means.

*Operation of Fig. 3 apparatus*

Considering now the operation of the Fig. 3 apparatus, focus-current variations may occure due to, for example, line-voltage variations which vary the potential $+B_3$ or to impedance variations of the focus windings 136, 137, 138 caused by temperature variations of the apparatus. The ballast tube 131 is of a type which provides increased impedance to increased current flow and decreased impedance to decreased current flow with the result that focus-current variations are reduced by the ballast tube. Any such variations which do occur, however, develop a voltage across the lamp circuit 139, **139*a*, 139*b*, which is, for example, proportional to the square of the current flow therethrough. This voltage is then applied to the cathode of the amplifier tube 147. A voltage proportional to the high voltage is applied to the control electrode of the tube 147 by the adjustable voltage divider 145, 146 to control the value of the high voltage in a manner which will be apparent subsequently. The control means is effective to maintain the voltage at the junction of the divider 145, 146 substantially equal to the voltage applied to the cathode of the tube 147** and is thus effective to regulate the high voltage in accordance with focus-current variations.

Assume for the moment that the focus current increases due to, for example, any of the previously mentioned causes. The voltage at the cathode of the tube 147 then increases accordingly, causing its anode voltage to rise and the anode voltage of the tube 149 to fall. A decrease in the anode voltage of the tube 149 increases the negative bias on the tube **144*a*, causing the tube 144*a* to draw reduced current flow from the high-voltage supply 144. Accordingly, the high-voltage output of the supply 144 rises, causing the voltage at the control electrode of the tube 147 to rise until it is substantially equal to the voltage at the cathode of the tube in accordance with the principles of operation of feed-back systems. Of course, a small error voltage remains between the control electrode and cathode potentials of the tube 147 which is amplified through the tubes 147 and 149 to maintain control of the ordinarily negative bias of the shunt regulator tube 144*a***.

From the foregoing description it will be seen that regardless of decreases or increases of focus current and of any tendency of high voltage to vary, the high-voltage supply is regulated in accordance with the variations of focusing current to remain, for example, proportional to the square of the focusing current. Accordingly, in accordance with the theory previously explained in connection with the Fig. 1 embodiment, such regulation of the high voltage with relation to the focus current reduces register and focus degradation.

From the foregoing description it will be apparent that color-image-reproducing apparatus constructed in accordance with the invention has the important advantages of minimizing focus and register degradation due to high-voltage variations or variations of the focusing means.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver of the image-projection type including an image-display screen, color-image-reproducing apparatus comprising: circuit means for supplying three signals individually representative of three predetermined primary colors of a composite color image to be reproduced; three cathode-ray image-reproducing devices responsive to said signals for individually developing component color images individually representative of said primary colors of said composite image and including focusing means comprising three adjustably positioned electromagnetic windings tending to have different magnetic beam-control characteristics and comprising three magnetic shunt bodies individually adjustably positioned relative to said windings for imparting substantially identical magnetic beam-control characteristics to said focusing means; an optical system including lens means and dichroic mirror means intermediate said devices and said screen for projecting said component color images on the receiver screen, said focusing means being positioned relative to said cathode-ray devices and said optical system to maintain said component images on the screen in register; high-voltage supply-circuit means for exciting said cathode-ray devices and subject to undesired voltage variations which tend to degrade the image focus and register of said devices; and current regulator circuit means coupled to said high-voltage supply-circuit means for developing a control current having percentage variations which are approximately directly proportional to the percentage variations of the high voltage supplied by said high-voltage supply-circuit means and coupled in series relation with said windings for applying said control current thereto substantially to reduce any register degradation caused by said voltage variations.

2. In a color-television receiver of the image-projection type including an image-display screen, color image-reproducing apparatus comprising: circuit means for supplying signals representative of predetermined primary colors of a composite color image to be reproduced; a plurality of cathode-ray image-reproducing devices including means for focusing the individual cathode-ray beams thereof and responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

3. In a color-television receiver of the image-projection type including an image-display screen, color-image-reproducing apparatus comprising: circuit means for supplying three signals individually representative of three predetermined primary colors of a composite color image to be reproduced; three cathode-ray image-reproducing devices including means for focusing the individual cathode-ray beams thereof and individually responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

4. In a color-television receiver of the image-projection type including an image-display screen, color-image-reproducing apparatus comprising: circuit means for supplying signals representative of predetermined primary colors of a composite color image to be reproduced; a plurality of cathode-ray image-producing devices including adjustably positioned means for focusing the individual cathode-ray beams thereof and responsive to said signals for individually developing component color images individually representative of said primary colors of said composite image; an optical system for projecting said component color images on the receiver screen in register, said focusing means being adjusted relative to said cathode-ray devices and said optical system to maintain said component images on the screen in register; high-voltage supply-circuit means for exciting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

5. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including a plurality of means for focusing the individual cathode-ray beams thereof and responsive to said signals for individually developing component color images individually representative of said primary colors of said composite image, at least two of said focusing means comprising individual electromagnetic windings tending to have different magnetic beam-control characteristics and at least one magnetic shunt body adjustably positioned relative to one of said windings for imparting similar magnetic beam-control characteristics to said focusing means; an optical system for projecting said component color images on the receiver screen in register; high-voltage supply-circuit means for exciting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

6. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including a plurality of means for focusing the individual cathode-ray beams thereof and responsive to said signals for individually developing component color images individually representative of said primary colors of said composite image, at least two of said focusing means comprising individual electromagnetic windings tending to have different magnetic beam-control characteristics and magnetic shunt bodies and individually adjustably positioned relative to said windings for imparting substantially identical magnetic beam-control characteristics to said focusing means; an optical system for projecting said component color images on the receiver screen in register; high-voltage supply-circuit means for exiting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

7. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including a plurality of means for focusing the individual cathode-ray beams thereof and responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and circuit means coupled to said high-voltage supply-circuit means for developing a control signal varying in accordance with said voltage variations and coupled to said plurality of focusing means for applying said control signal thereto substantially to reduce any register degradation caused thereby.

8. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including individual electromagnetic windings for focusing the individual cathode-ray beams thereof and responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and circuit means coupled to said high-voltage supply-circuit means for developing a control current varying in accordance with said voltage variations and coupled to said focusing windings for applying said control current thereto substantially to reduce any register degradation caused thereby.

9. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including means for focusing the individual cathode-ray beams thereof and responsive to said signals for individually developing component color images individually representative of said primary colors of said composite image; an optical system including lens means and dichroic mirror means intermediate said devices and the receiver screen for projecting said component color images on the screen in register; high-voltage supply-circuit means for exciting said cathode-ray devices and subject to undesired voltage variations which tend to degrade the image register of said devices; and means coupled to said high-voltage supply-circuit means and to said focusing means for controlling said focusing means in accordance with said voltage variations substantially to reduce any register degradation caused thereby.

10. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including means for focusing the individual cathode-ray beams thereof and responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and current regulator circuit means coupled to said high-voltage supply-circuit means and coupled in series relation with said focusing means for controlling said focusing means in accordance with said voltage variations substantially to reduce any register degradation caused thereby.

11. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including electromagnetic means for focusing the individual cathode-ray beams thereof and responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image focus of said devices; and means coupled to said high-voltage supply-circuit means and to said focusing means for maintaining the magnetic field intensity developed by said focusing means approximately directly proportional to the square root of the magnitude of the high voltage supplied by said high-voltage supply-circuit means substantially to reduce any register degradation caused thereby.

12. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including electromagnetic means for focusing the individual cathode-ray beams thereof and responsive to said signals for individually developing component color images individually representative of said primary colors of said componsite image; an optical system for projecting said component color images on the receiver screen in register; high-voltage supply-circuit means for exciting said cathode-ray devices and subject to undesired voltage variations which tend to degrade the image focus of said devices; and means coupled to said high-voltage supply-circuit means for developing a control current having percentage variations which are approximately directly proportional to percentage variations of the high voltage supplied by said high-voltage supply-circuit means and coupled to said focusing means for applying said control current thereto substantially to reduce any register degradation caused thereby.

13. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices including means controlling the individual cathode-ray beams thereof and effective to position the individual image rasters thereof, said image-reproducing devices being effective individually to develop component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; and means coupled to said high-voltage supply-circuit means and to said beam-control means for controlling said beam-control means in accordance with said voltage variations substantially to reduce any register degradation caused thereby.

14. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means controlling the individual cathode-ray beams of said cathode-ray image-reproducing devices and effective to position the individual image rasters thereof and subject to undesired variations which tend to degrade the image register of said devices; and means coupled to said high-voltage supply-circuit means and to said beam-control means for controlling one of said high-voltage supply and beam-control means in accordance with variations of the other substantially to reduce any register degradation caused thereby.

15. On a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means for focusing the individual cathode-ray beams of said cathode-ray image-reproducing devices and subject to undesired variations which tend to degrade the image register of said devices; and means coupled to said high-voltage supply-circuit means and to said focusing means for controlling one of said high-voltage supply and focusing means in accordance with variations of the other substantially to reduce any register degradation caused thereby.

16. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means including energizing circuit means for focusing the individual cathode-ray beams of said cathode-ray image-reproducing devices and said energizing circuit means being subject to undesired variations which tend to degrade the image register of said devices; and means coupled to said high-voltage supply-circuit means and to said focusing means for controlling said high-voltage supply-circuit means in accordance with variations of said energizing circuit means substantially to reduce any register degradation caused thereby.

17. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means including electromagnetic beam-focus windings for focusing the individual cathode-ray beams of said cathode-ray image-reproducing devices and subject to undesired impedance variations caused by temperature variations of the apparatus which tend to degrade the image register of said devices; and means coupled to said high-voltage supply-circuit means and to said focusing means for controlling said high-voltage supply-circuit means in accordance with variations of said focusing means substantially to reduce any register degradation caused thereby.

18. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means including series-coupled electromagnetic beam-focus windings having substantially identical beam-control characteristics for focusing the individual cathode-ray beams of said cathode-ray image-reproducing devices and subject to undesired variations which tend to degrade the image register of said devices; and means coupled to said high-voltage supply-circuit means and to said focusing means for controlling said high-voltage supply-circuit means in accordance with variations of said focusing means substantially to reduce any register degradation caused thereby.

19. In a color-television receiver of the image-projection type including an image-display screen, color-image-reproducing apparatus comprising: circuit means for supplying signals representative of predetermined primary colors of a composite color image to be reproduced; a plurality of cathode-ray image-reproducing devices responsive to said signals for individually developing component color images individually representative of said primary colors of said composite image; an optical system for projecting said component color images on the receiver screen in register; high-voltage supply-circuit means for exciting said cathode-ray devices and subject to undesired voltage variations which tend to degrade the image register of said devices; means for focusing the individual cathode-ray beams of said cathode-ray image-reproducing devices and subject to undesired variations which tend to degrade the image register of said devices; and means coupled to said high-voltage supply-circuit means and to said focusing means for maintaining the magnitude of the high voltage supplied by said high-voltage supply-circuit means approximately directly proportional to the square of the magnetic field intensity developed by said focusing means substantially to reduce any register degradation caused thereby.

References Cited in the file of this patent

UNITED STATES PATENTS

| | | |
|---|---|---|
| 2,611,816 | Darke | Sept. 23, 1952 |
| 2,697,744 | Richman | Dec. 21, 1954 |
| 2,744,951 | Gibson | May 8, 1956 |
| 2,752,419 | Bailey | June 26, 1956 |
| 2,757,231 | Law | July 31, 1956 |

OTHER REFERENCES

Pages 93–110 of Cathode Ray Tube Displays, vol. 22, M. I. T. Radiation Lab. Series, McGraw-Hill.